(12) United States Patent
Vallette

(10) Patent No.: US 12,548,858 B2
(45) Date of Patent: Feb. 10, 2026

(54) ELECTRIC BATTERY FOR A VEHICLE

(71) Applicant: Capacite, Bordeaux (FR)

(72) Inventor: Alexandre Emile Albert Vallette, Bordeaux (FR)

(73) Assignee: Capacite, Bordeaux (FR)

( * ) Notice: Subject to any disclaimer, the term of this patent is extended or adjusted under 35 U.S.C. 154(b) by 598 days.

(21) Appl. No.: 17/642,407

(22) PCT Filed: Sep. 4, 2020

(86) PCT No.: PCT/EP2020/074833
§ 371 (c)(1),
(2) Date: Mar. 11, 2022

(87) PCT Pub. No.: WO2021/048028
PCT Pub. Date: Mar. 18, 2021

(65) Prior Publication Data
US 2022/0416369 A1 Dec. 29, 2022

(30) Foreign Application Priority Data
Sep. 13, 2019 (FR) ........................................ 1910127

(51) Int. Cl.
*H01M 50/519* (2021.01)
*H01M 10/04* (2006.01)
(Continued)

(52) U.S. Cl.
CPC ..... *H01M 50/519* (2021.01); *H01M 10/0481* (2013.01); *H01M 10/425* (2013.01);
(Continued)

(58) Field of Classification Search
CPC ............. H01M 50/519; H01M 50/213; H01M 50/242; H01M 50/249; H01M 50/289;
(Continued)

(56) References Cited

U.S. PATENT DOCUMENTS

2012/0148877 A1* 6/2012 Kalman ............... H01M 50/512
429/7
2017/0194616 A1* 7/2017 Yang ....................... B60L 50/64
(Continued)

FOREIGN PATENT DOCUMENTS

DE     10201406414 A1    11/2015
FR        3071671 A1    3/2019

OTHER PUBLICATIONS

International Search Report for corresponding PCT Application No. PCT/EP2020/074833 mailed Nov. 30, 2020.

*Primary Examiner* — Eugenia Wang
(74) *Attorney, Agent, or Firm* — Wood, Phillips, Katz, Clark & Mortimer

(57) ABSTRACT

The invention relates to an electric battery (1) comprising: a plurality of electric charge cells (2), each cell having end faces (21, 22) that are located on opposite sides of the cell, each end face being provided with a contact terminal (23); at least one first printed circuit board (41) arranged in line with the end faces that are located at one of the sides of the cells, the printed circuit board being provided with a plurality of first electrical connection elements (43), each of the first electrical connection elements being located facing one of the contact terminals of the cells; characterized in that the first printed circuit board comprises a main portion (44) in which a plurality of slots (45) are formed, each slot defining a tab (46) that is elastically deformable with respect to the main portion, each first electrical connection element being arranged on one of the tabs of the first printed circuit board.

7 Claims, 2 Drawing Sheets

(51) Int. Cl.
*H01M 10/42* (2006.01)
*H01M 50/213* (2021.01)
*H01M 50/242* (2021.01)
*H01M 50/249* (2021.01)
*H01M 50/289* (2021.01)
*H01M 50/503* (2021.01)
*H01M 50/548* (2021.01)

(52) U.S. Cl.
CPC ....... *H01M 50/213* (2021.01); *H01M 50/242* (2021.01); *H01M 50/249* (2021.01); *H01M 50/289* (2021.01); *H01M 50/503* (2021.01); *H01M 50/548* (2021.01); *H01M 2220/20* (2013.01)

(58) Field of Classification Search
CPC ............. H01M 50/503; H01M 50/548; H01M 50/502; H01M 10/0481; H01M 10/425; H01M 2220/20
See application file for complete search history.

(56) References Cited

U.S. PATENT DOCUMENTS

2017/0346139 A1* 11/2017 Kobayashi ........ H01M 10/0445
2019/0221814 A1    7/2019 Shimizu
2019/0312251 A1* 10/2019 Matthews ........... H01M 50/526

* cited by examiner

[Fig. 1]
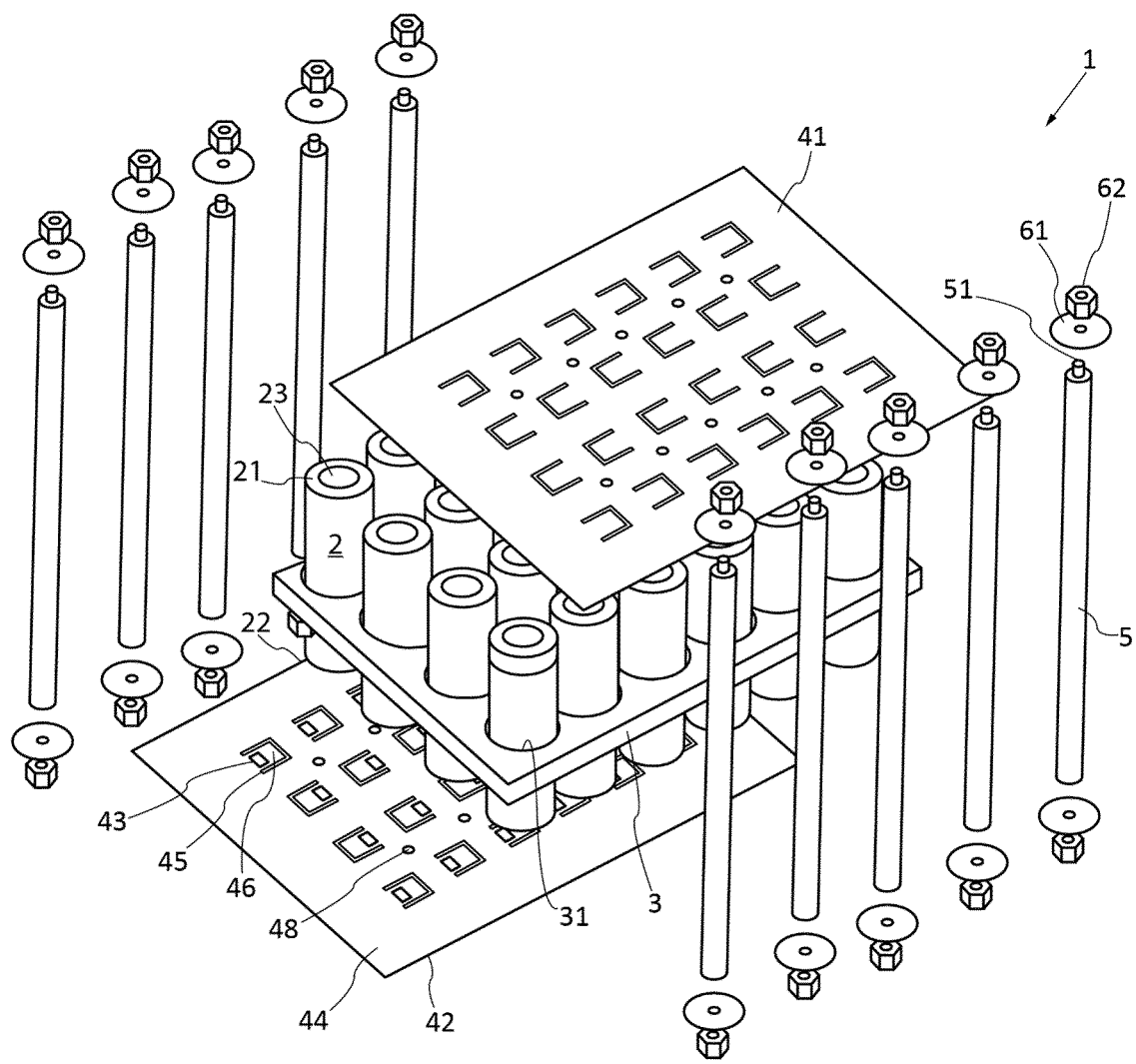

[Fig. 2]
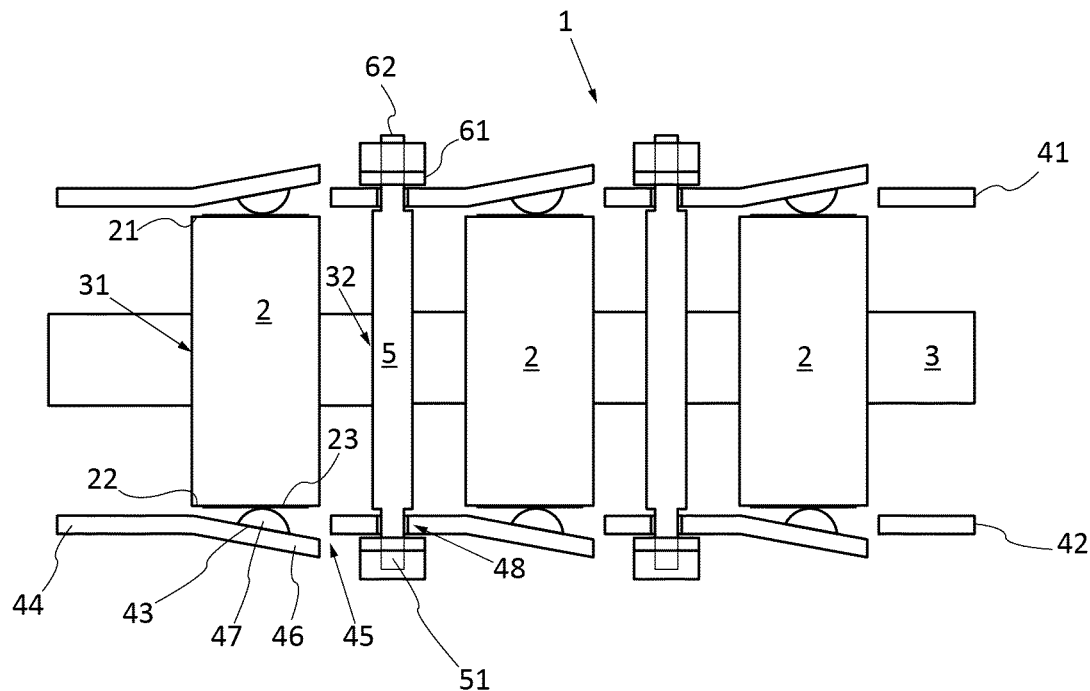
[Fig. 3]
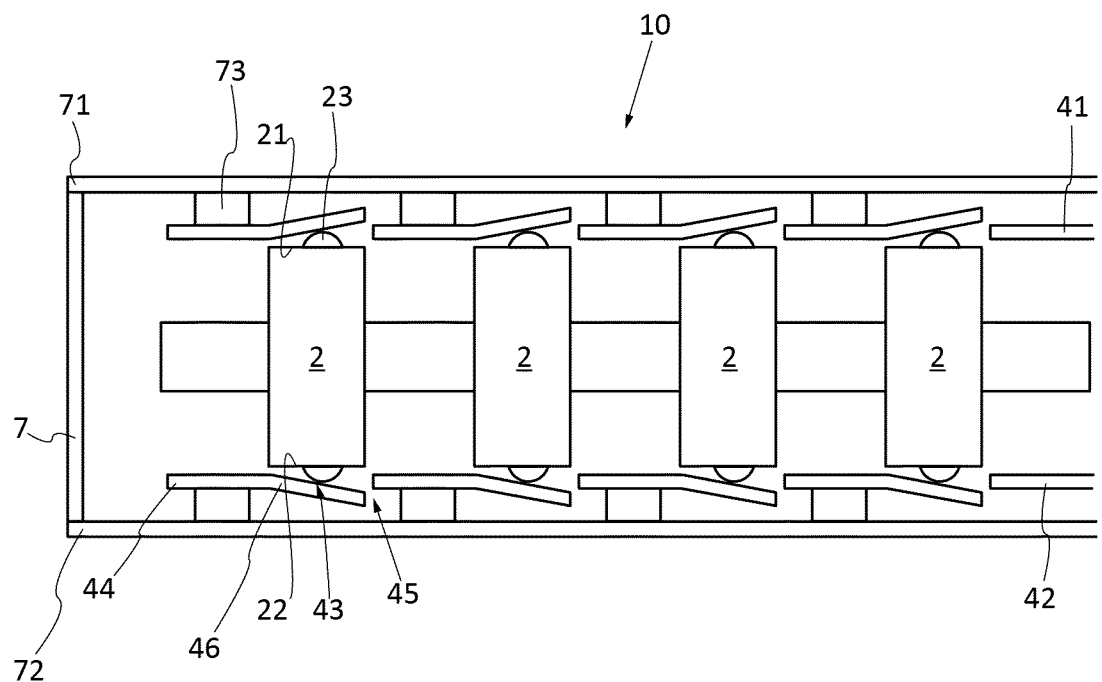

ELECTRIC BATTERY FOR A VEHICLE

FIELD OF THE INVENTION

The invention relates to the field of electric batteries for vehicles. More specifically, the invention relates to the field of the electrical interconnection of electric charge cells of an electric battery.

BACKGROUND OF THE INVENTION

The electric batteries, in particular in the case of electric vehicles, generally consist in an assembly of electric charge cells, also referred to as accumulators. When they are interconnected, in series or in parallel, these accumulators make it possible to deliver an electric power, for example intended to electrically supply the equipment of the vehicle, or indeed its engine.

In order to interconnect the cells, it is known to use connecting tapes, welded to each terminal of each cell. However, this solution is not satisfactory, insofar as it requires a large number of welding operations and prevents the battery from being dismantled, for example in order to replace worn cells within the context of an operation of servicing or reconditioning of the battery.

Another known solution, from document FR3071671, consists in interconnecting the cells by means of two printed circuit boards arranged on either side of the cells, each being provided with electrical connection elements which are each intended to come into contact with a contact terminal of one of the cells. Since the batteries are subjected to impacts or vibrations, in particular when the vehicles in which they are installed travel on an uneven road, the connection elements are generally designed so as to be elastically deformable, so as to maintain contact with the cells. These connection elements are thus welded or soldered to the electronic card. This solution is not satisfactory either, insofar as the electronic card equipped with such connection elements is complex to manufacture. Furthermore, the elastically deformable contact elements of the spring type are not capable of ensuring contact for all types of vibrations or impacts. The selection of the contact elements may thus prove to be time-consuming and costly.

There is thus a need for a battery in which the contact between the electric charge cells and a printed circuit board is resistant to vibrations, the battery being simple to assemble and refurbish. The invention comes within the scope of this context and aims to respond to this need.

BRIEF SUMMARY OF THE INVENTION

For this purpose, the invention relates to an electric battery, comprising:
a. a plurality of electric charge cells, each cell having end faces that are located on opposite sides of the cell, each end face being provided with a contact terminal;
b. at least one first printed circuit board arranged in line with the end faces located on one of the sides of the cells, the printed circuit board being provided with a plurality of first electrical connection elements, each of the first electrical connection elements being located facing one of the contact terminals of the cells;

The invention is characterized in that the first printed circuit board comprises a main portion in which a plurality of slots are formed, each slot defining a tab that is elastically deformable with respect to the main portion, each first electrical connection element being arranged on one of the tabs of the first printed circuit board.

It will thus be understood that forming elastically deformable tabs, by means of slots, makes it possible to maintain contact between the first electrical connection elements of the first printed circuit board, and the contact terminals of the cells, without requiring contact elements that are specifically designed to resist vibrations and impacts to which the battery may be subjected. In other words, it is possible to use particularly simple and standard contact elements, which makes it possible to simplify the design of the battery and to reduce the cost thereof. Furthermore, it is possible to provide slots which are specifically designed for particular vibration conditions, it thus being possible for the elasticity of the tabs to be defined according to a specific need, for example by adjusting the dimensions thereof. Finally, the use of a printed circuit board instead of connection tapes welded to the cells makes it possible to replace one or more cells when they are worn.

An "electric charge cell" means an elementary device, for example electrochemical, for storing electricity, which can discharge and be charged. Each cell may be of the lithium type, for example of the lithium-ion type or of the lithium-polymer type. Each cell may for example be generally cylindrical in shape, the contact terminals being provided on each end face defining the cylinder.

A "printed circuit board" means a printed circuit board (PCB) provided with electric tracks which interconnect the connection elements, and are in particular connected to an output connector so as to collect the electric power stored in each of the electric charge cells, towards said output connector. If desired, the first printed circuit board may comprise a battery management system (BMS).

Advantageously, the first printed circuit board is arranged with respect to the cells such that each cell creates a mechanical force on each tab that is directed towards the outside of the battery, and in which each tab of the first printed circuit board forms a spring having a restoring force directed towards the inside of the battery. If applicable, each slot of the first printed circuit board may be U-shaped. The tab defined by each slot is thus connected to the main portion of the first printed circuit board by just one of the edges thereof. If desired, the slots may be formed by cutting the main portion of the first printed circuit board, prior to assembling the battery.

In an embodiment of the invention, each first connection element is provided with a bulge formed of an electrically conductive material which comes into contact with the contact terminal of one of the cells. Said bulge may for example be formed by deposition of molten electrically conductive material, for example tin, in the region of a termination of an electric track located on the tab. This embodiment makes it possible to facilitate the contact between the electric track and the contact terminal, in the case where the contact terminal is flat.

In another embodiment of the invention, the contact terminal of each cell intended to come into contact with one of the first connection elements protrudes from the end face of the cell. In this case, the first connection element may be flat.

Advantageously, the battery comprises a spacer member that is arranged to keep the cells at a distance from one another, the spacer member and the first printed circuit board being arranged so as to hold the cells and the first printed circuit board such that each of the first electrical connection elements is located facing one of the contact terminals of the cells. For example, the battery may comprise just one spacer member. Preferably, the spacer member is arranged so as to keep the cells in a matrix-like arrangement, side-by-side. If applicable, the first connection elements are distributed on the first printed circuit board according to an arrangement corresponding to that of the cells.

Preferably, the spacer member consists in a single plate having a plurality of first through-passages, each cell being engaged through one of the first through-passages. If applicable, each through-passage may comprise a profile which substantially corresponds, in shape and dimensions, to that of the cell which it receives.

Advantageously, the battery comprises a second printed circuit board arranged in line with the end faces located on the other of the sides of the cells, the second printed circuit board being provided with a plurality of second electrical connection elements, each of the second electrical connection elements being located facing one of the contact terminals of the cells. If applicable, the second printed circuit board comprises a main portion in which a plurality of slots are formed, each slot defining a tab that is elastically deformable with respect to the main portion, each second electrical connection element being arranged on one of the tabs of the second printed circuit board.

Advantageously again, the battery comprises a fixing member that is arranged to keep the first printed circuit board on the second printed circuit board. If applicable, the fixing member may be arranged to exert a force on each of the first and second printed circuit boards, which force is directed towards the inside of the battery. The printed circuit boards are thus placed under stress, such that the cells generate a mechanical stress on the tabs.

For example, the fixing member may comprise one or more connection rods that are fixed to the first printed circuit board and optionally to the second printed circuit board. If applicable, each printed circuit board comprises one or more openings, each connection rod being intended to be engaged through one of said openings. Advantageously, the fixing member may comprise one or more secondary through-passages, each arranged facing one of the openings of the first and/or second printed circuit boards, each connection rod being intended to be engaged through one of the secondary through-passages. Alternatively or in addition, the fixing member may comprise a housing to which the first and second printed circuit boards are fixed. If applicable, the housing may comprise protrusions, each arranged facing a zone of the main portion of the first and/or of the second printed circuit boards located in line with the tabs, so as to exert a force on said first and/or second printed circuit boards, which force is directed towards the inside of the battery.

Advantageously, the battery comprises a housing which is arranged so as to receive the plurality of cells and the first printed circuit board, the housing comprising a means for assembly to an element of a vehicle, in particular to a chassis of an electric vehicle or to a frame of a bicycle.

BRIEF DESCRIPTION OF THE DRAWINGS

The present invention will now be described with reference to examples, which are given merely by way of example and in no way limit the scope of the invention, and on the basis of the accompanying drawings, in which:

FIG. 1 is a partial, schematic exploded view of a battery according to a first embodiment of the invention;

FIG. 2 is a cross-sectional view of the battery of FIG. 1; and

FIG. 3 is a cross-sectional view of a battery according to a second embodiment of the invention.

DETAILED DESCRIPTION OF THE INVENTION

In the following description, elements which are identical, in terms of structure or function, are provided with the same reference signs in different figures, unless otherwise specified.

FIG. 1 is an exploded view of an electric battery (1) of an electric vehicle, according to a first embodiment of the invention. FIG. 2 is furthermore a cross-sectional view of the battery 1 of FIG. 1 when assembled.

The battery 1 comprises a plurality of electric charge cells 2, each cell 2 being an accumulator of the lithium ion type, which is cylindrical in shape and has an upper end face 21 and a lower end face 22, each provided with a planar contact terminal 23.

The cells 2 are arranged side-by-side, in a matrix-like arrangement. The battery 1 comprises a single spacer plate 3 that is provided with a plurality of first cylindrical through-passages 31 which are arranged in a matrix-like manner on the plate, and the dimensions of which correspond to those of the cells 2. Each cell 2 is engaged in one of the passages 31, such that the spacer plate 3 keeps the cells 2 at a distance from one another.

The battery 1 comprises a first printed circuit board 41, arranged above the cells 2, on the side of the upper end faces 21, and a second printed circuit board 42, arranged below the cells 2, on the side of the lower end faces 22.

Each printed circuit board 41 and 42 comprises a plurality of electrical connection elements 43 which are interconnected by electric tracks towards an output terminal of the printed circuit board (not shown), the output terminals of the boards 41 and 42 being connected to a supply connector of the battery 1 (not shown). By virtue of the spacer plate 3, the cells 2 are kept such that each of their contact terminals 23 is facing one of the electrical connection elements 43 of the printed circuit boards 41 and 42.

Each printed circuit board 41 and 42 comprises a main portion 44, in which U-shaped slots 45 have been cut. Each of the slots 45 defines a tab 46 connected to the main portion by just one of the edges thereof. Each tab 46 is thus elastically deformable with respect to the main portion 44, and forms a spring having a restoring force which returns the tab 46 towards the main portion 44 when a force is exerted on said tab 46.

In the example of FIG. 1 and FIG. 2, each electrical connection element 43 is formed on one of the tabs 46 of the printed circuit boards 41 and 42, and comprises, for this purpose, a tin bulge 47 arranged in the region of a termination of an electric track extending on said tab 46.

Furthermore, the battery 1 comprises a plurality of connection rods 5 which are intended to be inserted between the printed circuit boards 41 and 42, being engaged in secondary through-passages 32 of the spacer plate 3, provided between the first through-passages 31. Openings 48 are formed in the main portions 44 of the printed circuit boards 41 and 42, between the slots 45 and facing the primary through-passages 31. Each connection rod 5 comprises a threaded projection 51 at each of the ends thereof, intended to be engaged through the holes 48 of the printed circuit boards 41 and 42. A washer 61 is inserted into each projection 51, and a bolt 62 is assembled with each projection 51 in order to fix each connection rod 5 to the boards 41 and 42. It will be noted that the orientations of the slots 45 provided on either side of the openings 48 are opposing, so as to allow for the washers 61 to be held on the boards 41 and 42, said washers allowing for uniform holding.

In order to assemble the battery 1, the cells 2 are inserted into the primary through-passages 31 of the spacer plate 3, and the connection rods 5 are inserted into the secondary through-passages 32. The first and second printed circuit boards 41 and 42 are arranged on either side of the assembled cells 2, such that the contact terminals 23 are facing the electrical connection elements 43. The washers 61 are then mounted on the projections 51 of the connection rods, and the bolts 62 are screwed onto said projections 51 so as to constrain the boards 41 and 42 and thus generate a force on the tabs 46, towards the inside of the battery. The assembly is arranged in a housing (not shown) which can be mounted, via an assembly means, on a vehicle, for example on the frame of an electric bicycle.

As shown in FIG. 2, during assembly of the battery 1, the screwing of the bolts 62 onto the projections 51 of the connection rods 5 exerts a uniform force, via the washers 62, on the printed circuit boards 41 and 42, towards the inside of the battery 1, i.e. towards the cells 2. Said force thus keeps the cells 2 in position between the printed circuit boards 41 and 42. In contrast, each of the cells 2 exerts, in the region of the upper 21 and lower 22 end face thereof, respectively, a force on the tab 46 of the first printed circuit board 41 and of the second printed circuit board 42, respectively, which said cell is arranged facing. Each tab 46 is thus elastically deformed by one of the cells 2, by being pushed towards the outside of the battery 1.

Since the force generated by the cell 2 on each tab 46 is oriented towards the outside of the battery 1, the restoring force of the spring formed by said tab 46 is thus exerted towards the inside of the battery 1, which maintains contact between the bulge 47 of the connection element 43 located on said tab 46 and the flat contact terminal 23 of the cell 2. From that point on, it is ensured that the contact between the connection element 43 and the contact terminal 23 can be maintained, even when the electric bicycle travels on an uneven road causing vibrations. Furthermore, the assembly of the battery 1, as well as the replacement of the cells 2 when they are worn, can be achieved easily and quickly, without a brazing or soldering operation.

FIG. 3 is a cross-sectional view of a battery 10 according to a second embodiment of the invention.

In contrast with the first embodiment of the invention of FIG. 1 and FIG. 2, the cells 2 comprise connection terminals 24 which are not flat but which protrude from the upper 21 and lower 22 end faces.

Furthermore, the fixing of the printed circuit boards 41 and 42 to one another is not achieved by means of connection rods 5, but directly by means of a housing 7 comprising an upper wall 71 and a lower wall 72 which are each provided with internal protrusions 73 arranged facing the printed circuit boards 41 and 42, in the region of zones located between the tabs 46. During assembly of the housing, by known means, a force is thus generated, by the internal protrusions 73, on the printed circuit boards 41 and 42, which force is directed towards the inside of the battery and which creates, in return, a force of the cells 2 on the tabs that is oriented towards the outside of the battery.

The description above clearly explains how the invention makes it possible to achieve the objectives it addresses, and in particular by proposing a battery of which the printed circuit board comprises slots defining elastically deformable tabs which receive the electrical connection elements intended to be in contact with the contact terminals of the cells. It is thus understood that the formation of said elastically deformable tabs makes it possible to form contacts between the connection elements and the contact terminals by virtue of connection elements which are not specifically designed for this purpose, making it possible to assemble the battery and charge the cells simply and quickly, the contacts even so being resistant to vibrations.

In any event, the invention is not limited to the embodiments specifically described in this document, and extends in particular to all equivalent means and to any technically possible combination of said means. In particular, it is possible to provide other slot and tab profiles, or indeed other methods for fixing the printed circuit boards, than those described.

What is claimed is:

1. An electric battery (1, 10) comprising:
   a) a plurality of electric charge cells (2), each cell having end faces (21, 22) that are located on opposite sides of the cell, each end face being provided with a contact terminal (23);
   b) at least one first printed circuit board (41) arranged in line with the end faces that are located at one of the sides of the cells, the at least one first printed circuit board being provided with a plurality of first electrical connection elements (43), each of the first electrical connection elements being located facing one of the contact terminals of the cells;
   characterized in that the at least one first printed circuit board comprises a main portion (44) in which a plurality of slots (45) are formed, each slot defining a tab (46) that is elastically deformable with respect to the main portion, each first electrical connection element being arranged on one of the tabs of the at least one first printed circuit board;
   characterized in that the electric battery comprises a second printed circuit board (42) arranged in line with the end faces (22) located on the other of the sides of the cells (2), the second printed circuit board being provided with a plurality of second electrical connection elements (43), each of the second electrical connection elements being located facing one of the contact terminals (23) of the cells, and in which the second printed circuit board comprises a main portion (44) in which a plurality of slots (45) are formed, each slot defining a tab (46) that is elastically deformable with respect to the main portion, each second electrical connection element being arranged on one of the tabs of the second printed circuit board;
   characterized in that the electric battery comprises a fixing member (5, 7) that is arranged to keep the at least one first printed circuit board (41) on the second printed circuit board (42), said fixing member being arranged to exert a force on each of the first and second printed circuit boards, wherein the force is directed towards an inside of the battery, and wherein the electrical connection between the cells and the electrical connection elements on the printed circuit board tabs is direct and does not involve any further conductive element.

2. The battery (1, 10) according to claim 1, wherein the at least one first printed circuit board (41) is arranged with respect to the cells (2) such that each cell creates a mechanical force on each tab (46) that is directed towards the outside of the battery, and wherein each tab of the at least one first printed circuit board forms a spring having a restoring force directed towards the inside of the battery.

3. The battery (1, 10) according to claim 1, wherein each slot (45) of the at least one first printed circuit board (41) is U-shaped.

4. The battery (1) according to claim 1, wherein each first connection element (43) is provided with a bulge (47) formed of an electrically conductive material which comes into contact with the contact terminal (23) of one of the cells (2).

5. The battery (1, 10) according to claim 1, characterized in that it comprises a spacer member (3) that is arranged to keep the cells (2) at a distance from one another, the spacer member and the at least one first printed circuit board (41) being arranged so as to hold the cells and the at least one first printed circuit board such that each of the first electrical connection elements (43) is located facing one of the contact terminals (23) of the cells.

6. The battery (1, 10) according to claim 5, wherein the spacer member (3) consists in a single plate having a plurality of first through-passages (31), each cell (2) being engaged through one of the first through-passages.

7. The battery (1, 10) according to claim 1, characterized in that it comprises a housing (7) which is arranged so as to receive the plurality of cells (2) and the at least one first printed circuit board (41), the housing comprising a means for assembly to an element of a vehicle.

* * * * *